United States Patent
Baiada et al.

(10) Patent No.: US 9,076,327 B1
(45) Date of Patent: Jul. 7, 2015

(54) METHOD AND SYSTEM TO PREDICT AIRPORT CAPACITY, LANDING DIRECTION, LANDING RUNWAY AND RUNWAYS AVAILABLE

(71) Applicants: Rade Michael Baiada, Evergreen, CO (US); Lonnie Howard Bowlin, Owings, MD (US)

(72) Inventors: Rade Michael Baiada, Evergreen, CO (US); Lonnie Howard Bowlin, Owings, MD (US)

(*) Notice: Subject to any disclaimer, the term of this patent is extended or adjusted under 35 U.S.C. 154(b) by 0 days.

(21) Appl. No.: 14/218,027

(22) Filed: Mar. 18, 2014

(51) Int. Cl.
| | |
|---|---|
| *G06F 19/00* | (2011.01) |
| *G08G 5/00* | (2006.01) |
| *G06Q 10/02* | (2012.01) |
| *B64D 45/00* | (2006.01) |
| *G08G 5/06* | (2006.01) |
| *G06Q 10/06* | (2012.01) |

(52) U.S. Cl.
CPC ............ *G08G 5/0043* (2013.01); *G08G 5/00* (2013.01); *G08G 5/0021* (2013.01); *G06Q 10/025* (2013.01); *B64D 45/00* (2013.01); *G08G 5/065* (2013.01); *G06Q 10/063* (2013.01); *G08G 5/0039* (2013.01)

(58) Field of Classification Search
CPC ... G08G 5/065; G08G 5/0039; G08G 5/0021; G08G 55/06; G08G 5/066; G08G 5/00; G06Q 10/025; G06Q 10/063; G06Q 10/06; G06Q 10/00; B64D 45/00
See application file for complete search history.

(56) References Cited

U.S. PATENT DOCUMENTS

| | | | |
|---|---|---|---|
| 6,278,965 B1* | 8/2001 | Glass et al. | 703/22 |
| 8,554,457 B2* | 10/2013 | White et al. | 701/120 |
| 2009/0171557 A1* | 7/2009 | Brozat | 701/120 |
| 2012/0245836 A1* | 9/2012 | White et al. | 701/120 |
| 2014/0309821 A1* | 10/2014 | Poux et al. | 701/14 |

* cited by examiner

*Primary Examiner* — Behrang Badii

(57) ABSTRACT

The present invention provides a method and system for automatically predicting the airport capacity (i.e., arrival capacity—the number of aircraft that can land in a given amount of time or landing rate), the landing direction (the direction of the landing runways, i.e., north, south, east or west), the landing runway (the specific runway on which the aircraft is predicted to land) for a set of specified aircraft, during a specified time period, at a specified airport, based upon consideration of available aviation data regarding the weather, landings runways, airport configuration, departures, etc., to achieve a more accurate airport capacity, landing direction and landing runway prediction.

24 Claims, 16 Drawing Sheets

Typical Airline Production Process

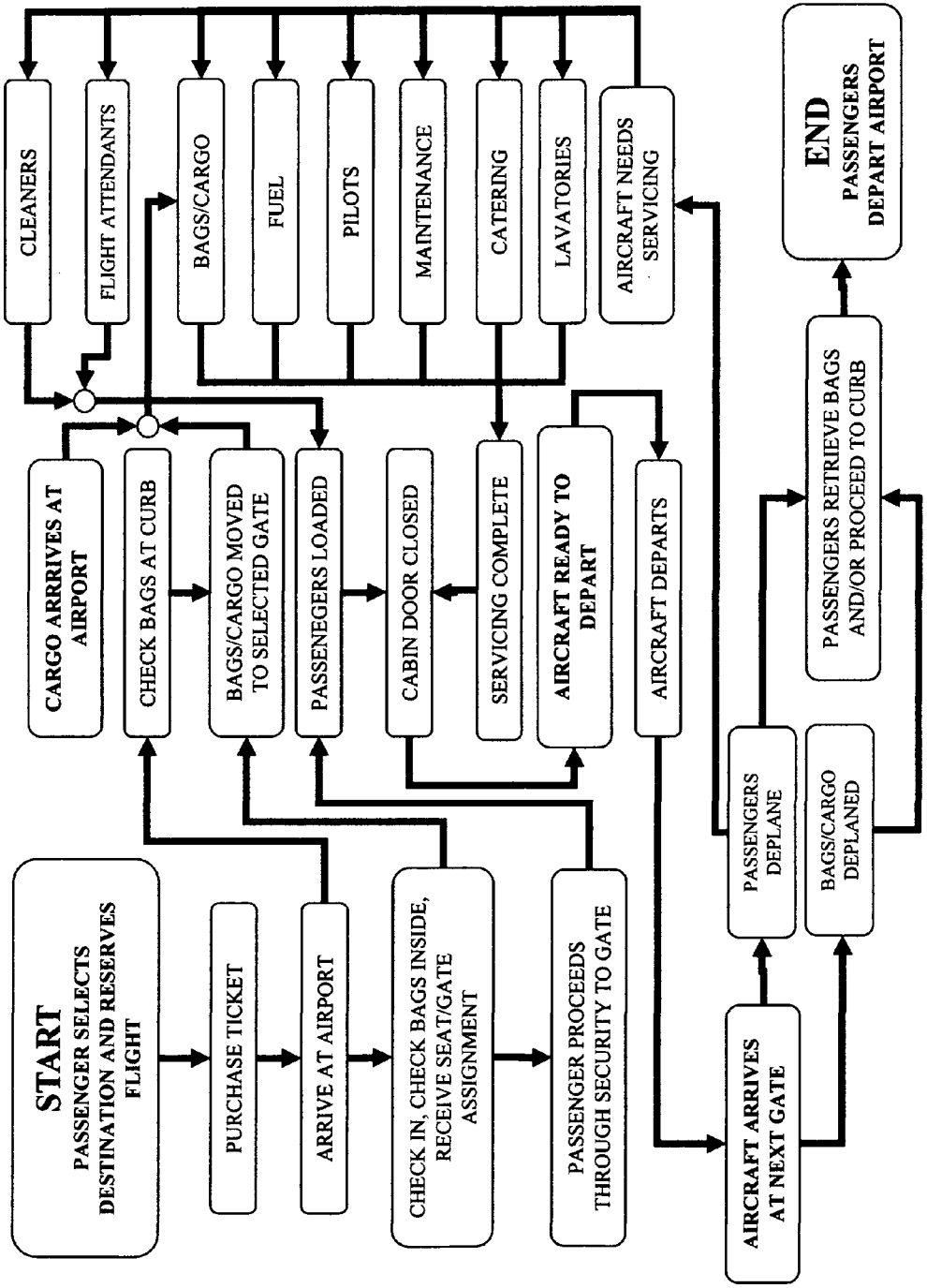
Fig. 1 - Typical Airline Production Process

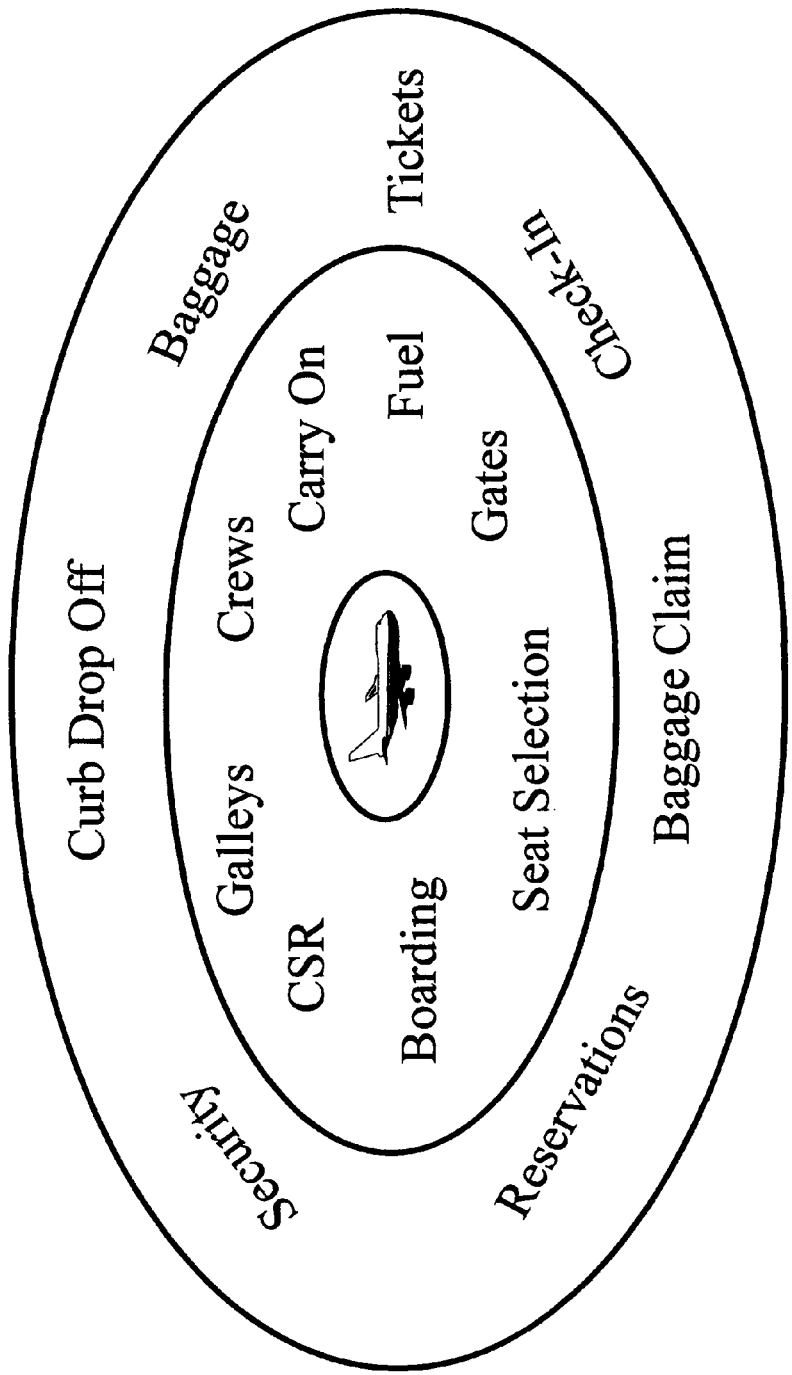
Fig. 2 - Airline Tasks Centered on Aircraft Movement

Fig. 3A - Task/Process Matrix Necessary to Meet the Airline's Operational and Business Goals

Customer/Passenger Needs/Wants

Focus: Individual Customer/Passenger Wants/ Needs

Question: What does the customer want/need/expect?

Tasks/Needs/Events/Activities:
1 - Arrive at the destination curb, on time, smiling & bag in hand
Easy process to plan the trip
Easy process to buy a ticket
Easy airport check-in and bag check
No lines
Easy gate check-in
Easy boarding
Depart on time
Smooth flight
Good service (i.e., food, drinks)
Comfortable seat
Arrive on time
Short Walk to exit/baggage claim
No waiting for bags

Fig. 3B - Task/Process Matrix Necessary to Meet the Airline's Operational and Business Goals

Airline Decisions

Focus: Airline Processes

Question: What is necessary for the airline to meet the passengers needs/wants/expectations?

Tasks/Needs/Events/Activities:

Sub-Process #1 - Planning to Boarding Area
- Trip planning process and ticket sales process, Airport check-in process, Bag check process, Security process, Passenger transportation process if required, Gate check-in process, Boarding process, Sub-Process #2 - Aircraft Servicing Process
- Crews, Fuel, Cleaners, etc.

Sub-Process #3 - Aircraft Movement Process
- Taxi, Flight, Landing, etc.

Sub-Process #4 - Boarding Area to Destination Curb
- De-planning process, Passenger transportation process if required, Bag claim process, Quality Control, Problem resolution

FIG 4A – Decision/Command Matrix Used to Calculate Aircraft Gate Arrival Times

Critical Factors:

1. What is the optimum airport arrival time for each aircraft as determined by the airline/user/pilot? (Note: the future trajectory prediction of all of the assets is an important aspect of this decision)
2. Can the individual airline (i.e. operator of the present invention) meet the needs of all of their aircraft approaching the specified airport?
3. Is the airspace infrastructure (runways, airspace, arrival fix) capable of meeting the aircraft needs taking into account available assets and the needs of all of the other aircraft?
4. Is approval/authorization required for the airline to use the common assets at the specified time?
5. What time are the control actions taken?

Fig. 4B - Decision/Command Matrix Used to Calculate Aircraft Gate Arrival Times

Decision 1 - Intra-Aircraft Requirements

Focus: Aircraft Needs and Wants

What does the individual aircraft need and/or want?
Arrival at airport at Scheduled Arrival Time
Evaluate future trajectories for needs (Look Ahead)
Enough airport Time to:
  - Get Passengers off/on
  - Get Baggage off/on
  - Get Cargo off/on
  - Complete Aircraft Servicing (lavs, food, etc.)
  - Complete required maintenance items
  - Depart on time for next segment
Enough connection time for passengers Maintenance Actions
  - Scheduled maintenance
  - Unscheduled repairs
  - Deicing
  - Known repairs
Shorter route
Comfortable ride
Use Minimum Fuel
A gate upon arrival
Crew (Pilots and Flight Attendants)

Key Questions
What services does aircraft need? Regular or special?
What time does aircraft want to arrive in a perfect world?

Sample Aircraft Characteristics Used in Predictions, Alternate Trajectory Calculations and Goal Function
Safe Speed Range
Fuel Burn Model (fuel available to make desired change)
Wind Model
Altitude Capability (aircraft weight)
Enroute Weather Model
Enroute Turbulence Model
Aircraft position data
Fuel Burn Model (minimum fuel usage)

Fig. 4C - Decision/Command Matrix Used to Calculate Aircraft Gate Arrival Times

Decision 2 - Intra-Airline Capabilities

Focus: Airline Capabilities to meet needs of all their aircraft approaching the airport

Can the airline meet the aircraft's needs?
- Gate Availability
- Jetway or Stair Availability
- Baggage Personnel Availability
- Fueling Availability
- Flow of Passenger Connecting Flights
- Mechanic Availability
- Dynamic Gate Management
- Asset Trajectory Matching
- Cleaning Personnel Availability
- Customer Agent Availability
- Galley Loading/Unloading
- Parts Availability

Key Questions
- What is the airline's ability to meet the needs of all of its aircraft?
- Will airline service capability delay aircraft?

Sample Airline Data Used in Predictions, Alternate Trajectory Calculations and Goal Function
- Gate data
- Fuel truck data
- Passenger data/model
- Mechanic data
- Crew data
- Customer Service Agent data
- Galley data
- Aircraft parts data

Fig. 4D - Decision/Command Matrix Used to Calculate Aircraft Gate Arrival Times

Decision 3 - Aviation Authority Capabilities/Data

Focus: Common Asset Capabilities (I.e., Infrastructure) to meet needs of all aircraft

Can the infrastructure meet the aircraft's needs?
- Airspace Availability
- Arrival Fix Availability
- Weather

- Runway Availability
- Infrastructure Trajectory Matching
- Demand versus capacity

Key Questions
- What is the aviation authority's ability to meet needs of all aircraft?
- Will infrastructure constraints delay aircraft?
- Is authorization required for use of the common assets?
- If required, how is said authorization coordinated with the authorization authority?

Sample Infrastructure Data Used in Predictions, Alternate Trajectory Calculations and Goal Function
- Runway Acceptance Rate
- Weather

- Cornerpost Acceptance Rate
- Equipment Status

Fig. 4E - Decision/Command Matrix Used to Calculate Aircraft Gate Arrival Times

Control Action 1 - Airline/Aviation Authority

Focus - How and When to Make Control Action Happen

Control Actions
Transmit current or updated trajectory to aircraft
Monitor actions to assure aircraft response meets the assigned trajectory

Key Questions
What time should control action take place?
How should pilot be notified?

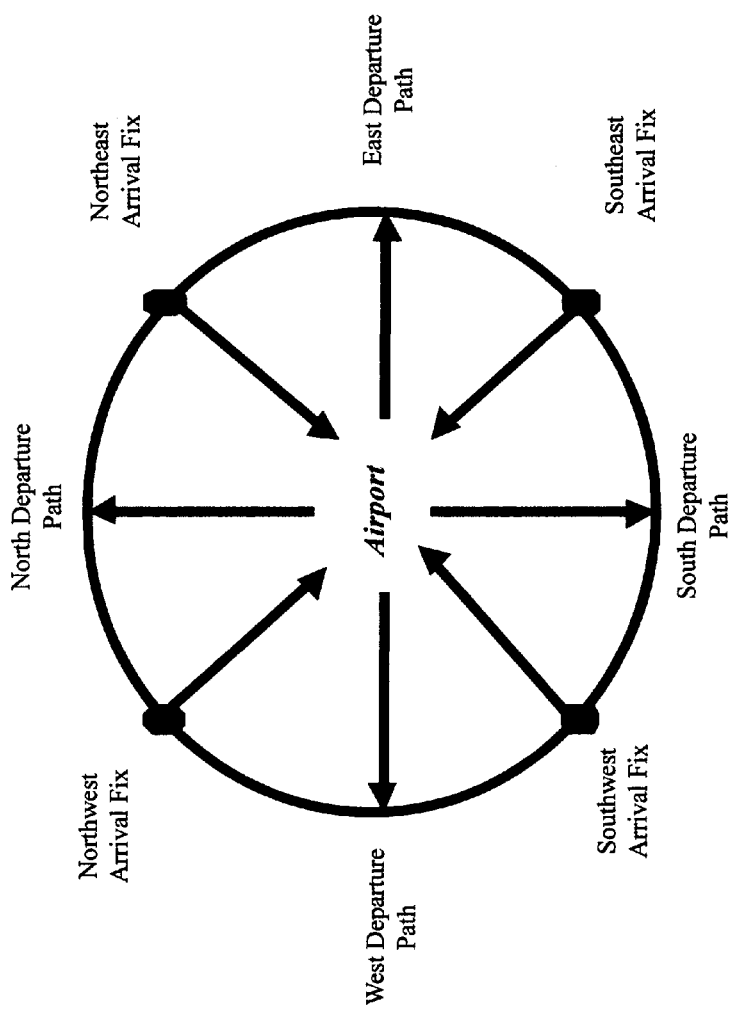
Fig. 5 - Airport Arrival/Departure Flow

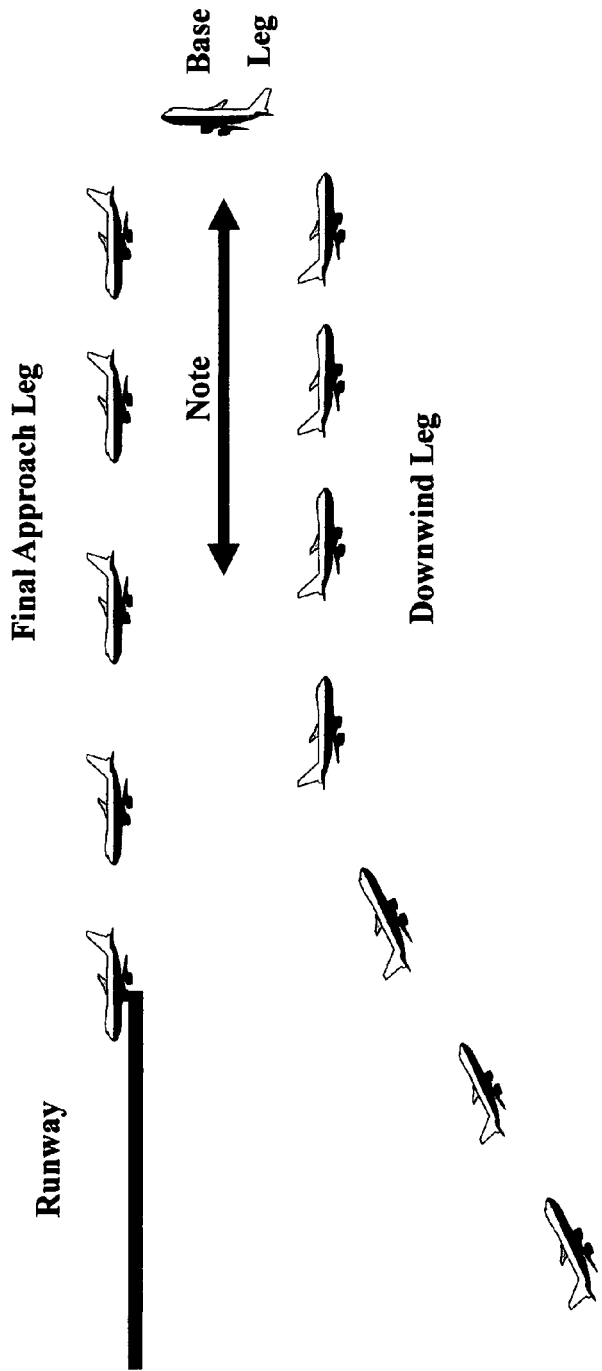

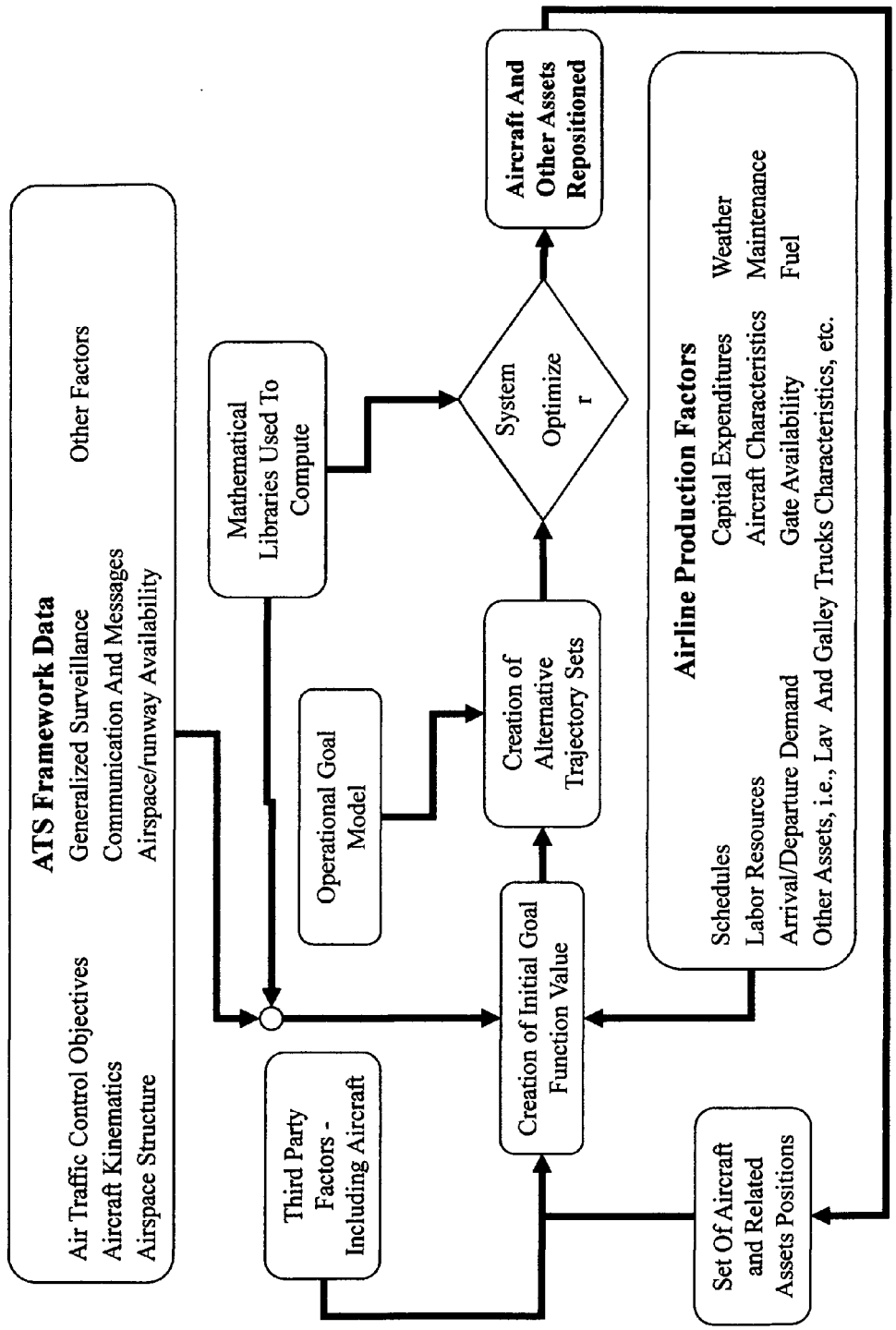
Fig. 7 - Sample Data Sets and Data Flow

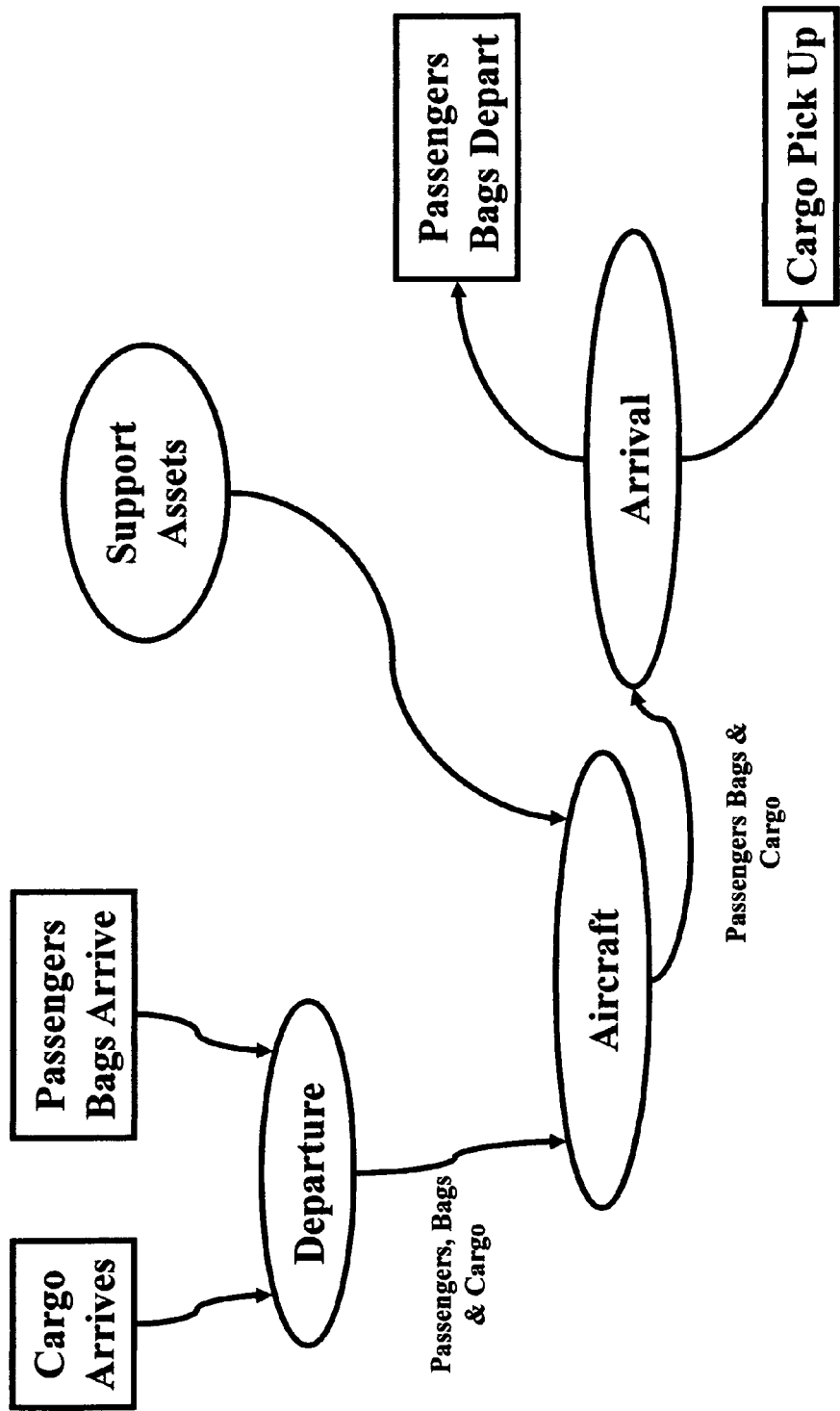
Fig. 8 - High Level View of the Current Airline Production Processes

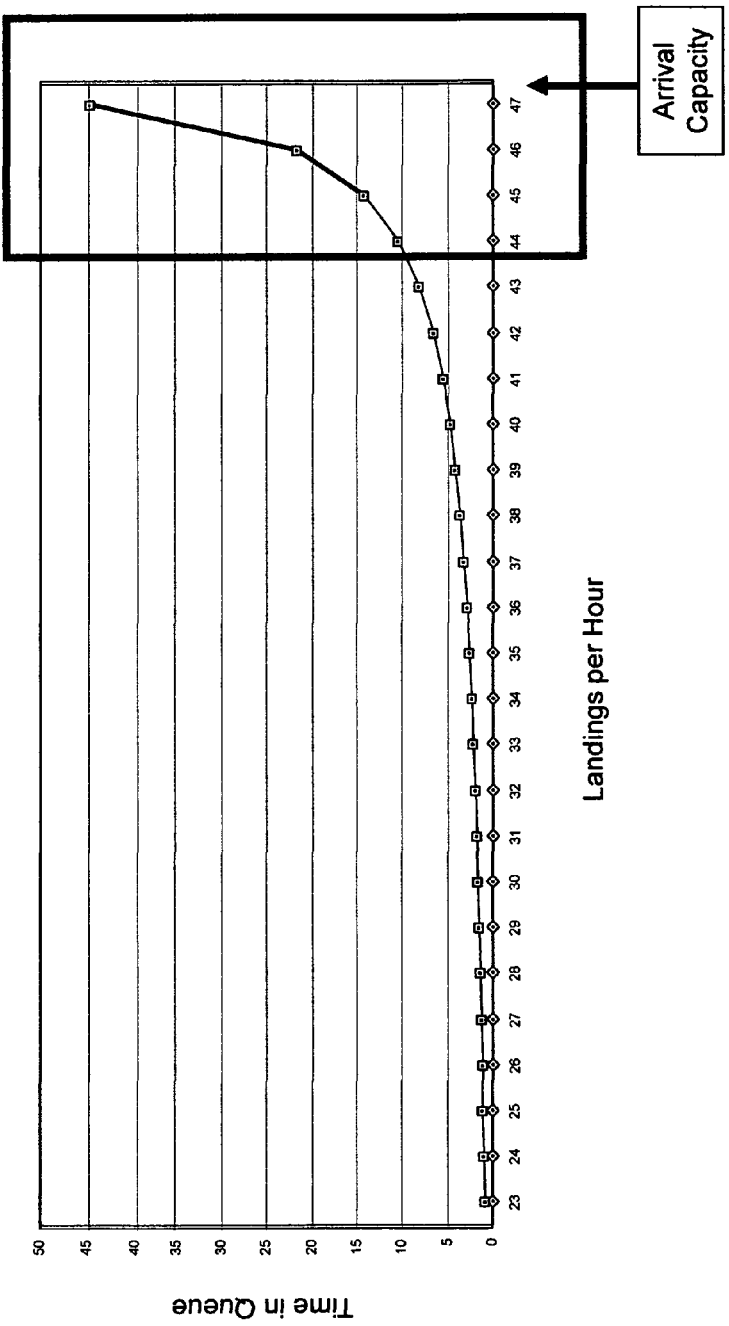
Fig. 9 - Effects of Variance
.. effects of variance get worse as demand nears the capacity of the system ..

Fig. 10 - Landing Capacity based on Correlation of and Weather/Runways Available

| | 2 Runways Available | 1 Runways available |
|---|---|---|
| Wx < 200' ceiling and ½ NM visibility | 56 | 29 |
| Wx > 200' ceiling and ½ NM visibility, but < 1000' ceiling and 3 NM visibility | 60 | 32 |
| Wx > 1000' ceiling and 3 NM visibility | 74 | 38 |

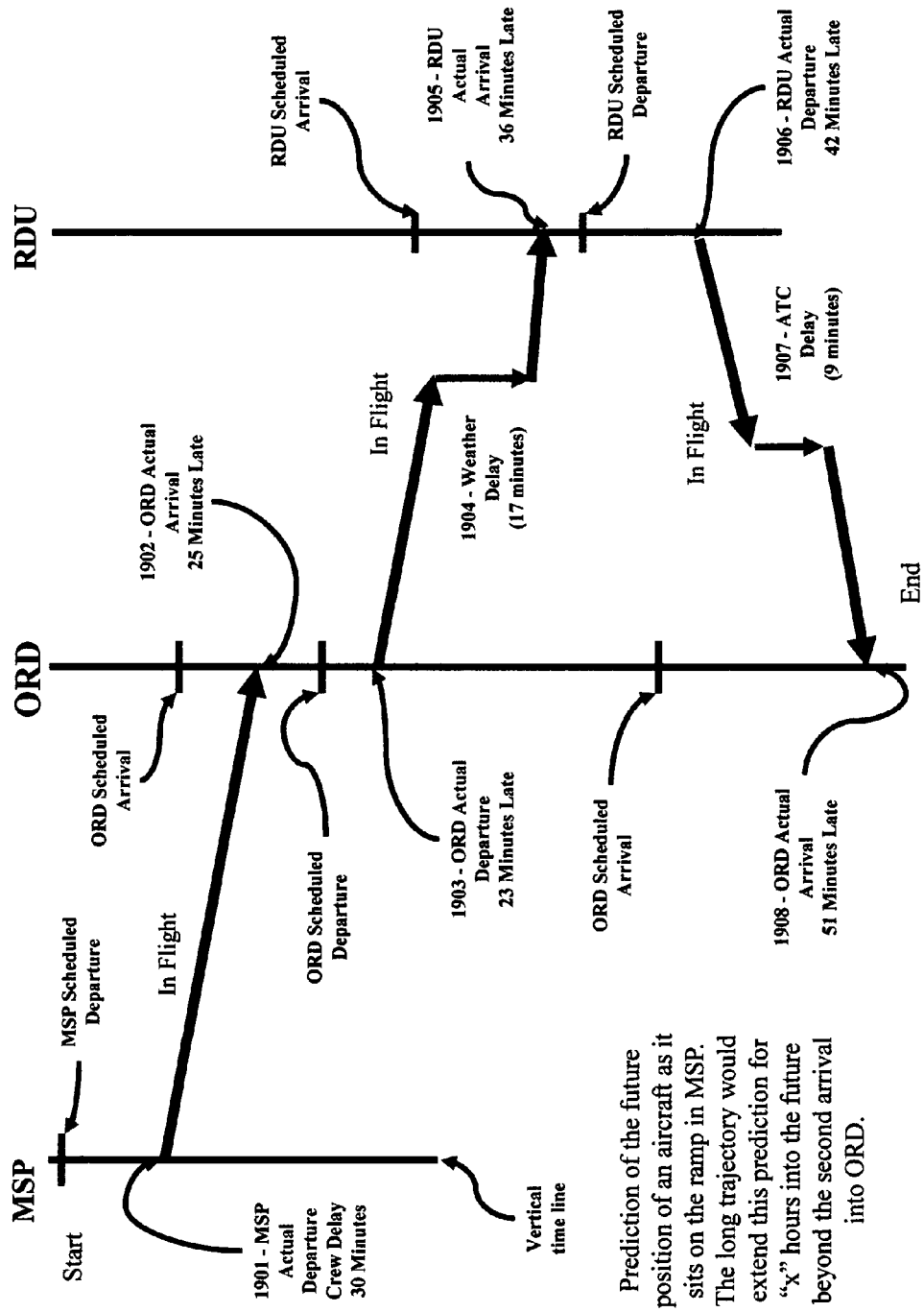

METHOD AND SYSTEM TO PREDICT AIRPORT CAPACITY, LANDING DIRECTION, LANDING RUNWAY AND RUNWAYS AVAILABLE

CROSS-REFERENCE TO RELATED APPLICATIONS

This application is related to the following U.S. Patent Documents: Provisional Application No. 60/129,563 entitled, "Tactical Aircraft Management" filed Apr. 16, 1999; Regular patent application Ser. No. 09/549,074 entitled, "Tactical Airline Management" filed Apr. 16, 2000; U.S. Pat. No. 6,721,714 entitled, "Method and System for Tactical Airline Management" issued Apr. 13, 2004;

Provisional Patent No. 60/274,109 entitled, "Method and System for Aircraft Flow Management by Airlines/Aviation Authorities"; Regular patent application Ser. No. 09/861,262 entitled, "Method and System for Aircraft Flow Management by Airlines/Aviation Authorities" filed May 18, 2001; U.S. Pat. No. 6,463,383 entitled, "Method And System For Aircraft Flow Management By Airlines/Aviation Authorities" issued Oct. 8, 2002;

Provisional Patent Application No. 60/332,614 entitled, "Method And System For Allocating Aircraft Arrival/Departure Slot Times" filed Nov. 19, 2001; Regular patent application Ser. No. 10/299,640 entitled, "Method And System For Allocating Aircraft Arrival/Departure Slot Times" filed Nov. 19, 2002; Regular patent application Ser. No. 10/238,032 entitled, "Method and System For Tracking and Prediction of Aircraft Trajectories" filed Sep. 6, 2002; U.S. Pat. No. 6,789,011 titled "Method And System For Allocating Aircraft Arrival/Departure Slot Times", issued Sep. 7, 2004;

Provisional Application No. 60/458,027, filed Mar. 25, 2003 and entitled, "Method and System for Aircraft System Flow Management by Airlines/Aviation Authorities"; Regular application Ser. No. 10/808,970, and initial PCT application on Mar. 25, 2004 entitled, "Method and System for Aircraft Flow Management"; U.S. Pat. No. 7,248,963 titled, "Method and System for Aircraft System Flow Management" issued Jul. 24, 2007. Priority date of Mar. 25, 2003;

Provisional Patent Application No. 60/493,494 entitled, "Method and System For Tactical Gate Management By Airlines, Airport and Aviation Authorities" filed Aug. 8, 2003; Provisional Patent Application No. 60/458,027 entitled, "Method and System for Aircraft System Flow Management by Airlines/Aviation Authorities" filed Mar. 25, 2003; Regular Patent Application entitled, "Method and System for Aircraft System Flow Management" filed Mar. 25, 2004;

Provisional Patent Application titled, "Method and System for Tracking and Prediction of Aircraft Arrival and Departure times", with a Ser. No. 60/317,803, filed Sep. 7, 2001; Regular Patent Application filed Sep. 6, 2002, with a Ser. No. 10/238,032, filed—Sep. 6, 2002; U.S. Pat. No. 6,873,903 titled, "Method and System for Tracking and Prediction of Aircraft Trajectories", issued Mar. 29, 2005;

Provisional Application No. 60/493,494, filed Aug. 8, 2003 and titled, "Method And System For Tactical Gate Management By Airlines/Airport/Aviation Authorities"; Regular application Ser. No. 10/913,062, filed on Aug. 6, 2004 and titled "Method And System For Tactical Gate Management By Airlines/Airport/Aviation Authorities"; U.S. Pat. No. 7,333,887 titled, "Method And System For Tactical Gate Management By Airlines/Airport/Aviation Authorities" issued Feb. 19, 2008.

Provisional Patent 61/688,578, filed May 17, 2012, titled "Method and System for Allocating Aircraft Arrival/Departure Times, with Preferred Movement".

Provisional Patent 61/741,599, filed Aug. 14, 2012, titled "Method and System to Predict Airport capacity, Landing Direction and Landing Runway".

All these applications and patents having been submitted by the same applicants: R. Michael Baiada and Lonnie H. Bowlin. The teachings of these materials are incorporated herein by reference to the extent that they do not conflict with the teaching herein.

BACKGROUND OF THE INVENTION

1. Field of the Invention

The present invention relates to data processing and predictive process. More particularly, this invention relates to methods and systems for automatically predicting the airport capacity (i.e., arrival capacity—the number of aircraft that can land in a given amount of time or landing rate), the landing direction (the direction of the landing runways, i.e., north, south, east or west), the landing runway (the specific runway on which the aircraft is predicted to land) for a set of specified aircraft, during a specified time period, at a specified airport, based upon consideration of available aviation data regarding the weather, landings runways, airport configuration, departures, etc., to achieve a more accurate airport capacity, landing direction and landing runway prediction.

Additionally, a more accurate and objective prediction of the future airport capacity, landing direction and/or landing runway, using available aviation data, allows airlines, Air Traffic Control (ATC) and airports to better prepare and manage various assets, airline/airport functions and services at the specified airport, from a system perspective, to improve ATC, airline and airport operations and profitability.

Considered aviation data includes, but is not limited to current and predicted: weather (wind direction, wind speed, temperature, cloud ceiling, precipitation, visibility, etc.), airport design and layout, airport/ramp/taxiway congestion (i.e., number of aircraft at the airport taxing to or waiting for a gate, etc.), available runways, runway length, runway turnoffs, runway condition (dry, wet, icy, snow covered, etc.), available taxiways, taxiway conditions, arrival demand (number of aircraft predicted to land), departure demand (number of aircraft planned to depart the specified airport, etc.), ongoing airport maintenance, etc., during the specified time period.

ATC/airport/airline functions that could be improved through a process to better predict the airport capacity, landing direction and/or landing runway include, but are not limited to: safety, increased throughput (pulling some of the aircraft forward into unused airport capacity), arrival queue management (which aircraft should land first, etc.), gate assignment, passenger/cargo servicing (e.g., boarding, baggage, security, aircraft loading, in-flight meal service, in-flight, deplaning, interconnection to subsequent flights, bag sorting and delivery), aircraft servicing (e.g., fuel, lavatories, catering, cleaning, maintenance, deicing, bag/cargo loading), aircraft management (e.g., departure time, route of flight, landing sequence, landing time, crew assignments, weather, ride comfort, pushback or power back, taxi, takeoff, climb, cruise, descent, approach, landing, parking), gate management (gate availability, etc.), and support services (e.g., operation and maintenance of support vehicles, training, accounting, scheduling, payroll).

2. Description of the Related Art

The need for and advantages of real time prediction of future environments and events to better manage operational systems that optimize complex, multi-dimensional, interdependent processes have long been recognized. Thus, many complex methods and optimization systems have been developed. For example, see U.S. Pat. Nos. 5,321,605, 5,369,570, 5,890,133 and 5,953,707.

However, as applied to prediction of future events (i.e., capacity versus demand) within the aviation industry, such methods often have been subjective, accomplished manually, fragmentary or overly restrictive and have not addressed the overall prediction of future events so as to better optimize an airline's, airport's or ATC system's operational functions.

The reasons for this situation are complex and varied, but include considerations such as: dynamic nature of the weather, airport capabilities, the complex interdependence of the airlines and their use of shared airport facilities (i.e., common assets), local control of the movement of the aircraft, extensive governmental regulations and the impact of the airlines' unmanaged assets and aircraft flows to name a few.

To better understand the airline processes, FIG. 1 has been provided to indicate the current airline passenger and cargo movement processes, which commences with passenger ticketing, followed by airport arrival, passenger loading, aircraft servicing (e.g., loading of fuel, food, and cargo) and ending after arrival at the terminal gate and delivery of baggage and cargo. It is of interest to note that the core process within the airline industry is the movement of the aircraft. It moves off the gate, then works towards the next gate, is offloaded, serviced, loaded; only to move off the gate again.

Since almost all of the airline's other operational processes key off of the movement of aircraft, the core elements of an airline can be thought of as being managed from the center out as depicted in FIG. 2.

Like most businesses, the various ATC systems, local ATC facilities (ground, tower, departure, center, approach, etc.), airports and airlines are segmented into a number of distinct types of cost centers, business units or organizational entities, with the movement of the aircraft left to the individual pilots and Aviation Authorities Air Traffic Control system (ATC), managed by FAA in the United States, other Civil Aviation Authorities (CAA) or Air Navigation Service Providers (ANSPS) around the world.

Although most airline, airport and ATC processes are interdependent, current business practices within the airline industry promote the management of the individual assets independently by the individual asset managers without regard to system effects, i.e., future airport capabilities and requirements, so as to better meet the ATC systems, airport and/or airline's overall system goal of maximizing operational efficiency.

This has traditionally meant that the ATC system, airport and/or airline, have no real time, objective process, as defined within the present invention, to predict the airport capacity, landing direction and/or landing runway, into the future, using all of the available aviation data, and thus end up working to locally optimize individual elements of the aviation process, to the detriment of the overall aviation system.

There appear to be few current attempts by the various ATC systems, airports and/or airlines around the world to predict the airport capacity, landing direction and/or landing runway into the future so as to better manage the arriving and departing aircraft to better meet the airport's and airline's overall business and operational goals.

These independent actions for each of the airline's assets, without regard to system effects or airport capacity, landing direction or landing runway, lead to variance in the asset flows, thus assuring a random outcome of the airline's operational processes.

For illustrative purposes, one can compare the aircraft arrival flow into a busy airport to the actions of grade school children at the end of class. When the dismissal bell rings, if all of the students rush to the door, fighting to be the first one out, while the capacity of the door remains unchanged, the actual throughput of the door is lowered.

Conversely, if the students file out in an orderly and sequenced fashion, based on the actual available capacity (i.e., students per unit time that can fit through the door), the actual throughput of the door can be higher. And while the capacity of the door remains the same, predicting the capacity of the door, and then managing the flow through the door based on that capacity, the effective throughput of the door is higher. The same can be said for an airport.

The explanation of the effects of randomness can be found in the mathematics of queue theory (see FIG. 15), which states that as the demand approaches capacity the queue waiting time increases at a capacity proportional to the inverse of the difference between demand and capacity.

Although ATC systems, airports and airlines currently have available to them the required data on the positions of their and other aircraft assets (e.g., Aircraft Situational Display to Industry (ASDI), Flight Management System (FMS) downlinked data from the aircraft, Automatic Dependent Surveillance (ADS and ADS-B/C), the communications (e.g., Intranet for system coordination, radios for ground personnel and assets, ARINC Communications Addressing and Reporting System (ACARS) for aircraft communication) and future environmental capability (i.e., weather, runways availability and conditions, gates, etc.) to make more accurate predictions necessary to tactically manage these assets in a more efficient and profitable manner, they apparently lack the necessary objective, operational and business processes and methods to utilize this data.

Instead, current business practices involve the use of much of this data to analyze operational results and errors after the fact, using post processing methods.

And while there have been rudimentary attempts by the ATC process of the world's aviation authorities to report current airport capacity, landing direction and/or landing runways (FAA AAR, ATIS) and subjectively predict airport capacity, these have not been accurate enough or too late in the aircraft arrival process to allow better management of the aircraft arrival flow and airport actions.

One such example of one such attempt to predict future airport capacity by FAA can be found at http://www.fly.faa.gov/Products/AADC/aadc.html. Unfortunately, the data inputs to this system are subjective, based on the local ATC supervisor's view of the future and the airport capacity prediction is not very accurate.

Another example includes the 2008 "Decision Support Tool for Predicting Aircraft Arrival Rates, Ground Delay Programs, and Airport Delays from Weather Forecasts" study completed by Smith and Sherry (http://catsr.ite.gmu.edu/pubs/Smith_ICRATPaper.pdf). This paper describes a process of using the airport Terminal Aerodrome Forecast (TAF), as is done in the present invention. But this paper describing prior art stops short of addressing the other necessary components necessary to predict the airport capacity, landing direction, landing runway and runways available outlined herein, and incorporated in the present invention.

Another example of an arrival capacity prediction is provided by the FAA in the United States (US). The FAA System Command Center (SCC located in Herndon, Va.) currently posts current arrival rates and future arrival rates on the internet (http://www.fly.faa.gov/Products/AADC/aadc.html). Unfortunately, these arrival rates are manually and subjectively calculated and the predictive accuracy of the airport arrival capacity in the time horizon of the present invention (1 to 8 hours) is very low.

Despite the above noted prior art, the need continues to exist for improved methods and systems for predictive process (airport capacity, landing direction and/or landing runway).

The current ATC, airport and airline problems and limitations enumerated above are not intended to be exhaustive, but rather are among many which tend to impair the effect predictive aviation process. Other noteworthy problems may also exist; however, those presented above should be sufficient to demonstrate the need for improvements in airline business methods.

3. Objects and Advantages

There has been summarized above, rather broadly, the prior art that is related to the present invention in order that the context of the present invention may be better understood and appreciated. In this regard, it is instructive to also consider the objects and advantages of the present invention.

The present invention employs a novel method of utilizing the currently available predictive weather data and other predictive data concerning the specified airport to predict the airport capacity, landing direction and/or landing runway into the future. That is, the method of the present invention of utilizing the available aviation data (weather, airport environmental conditions, runway availability, arrival/departure demand, etc.) includes a substantially continuous process of monitoring and predicting both the location and time dependent characteristics of the available aviation data, and continuously predicting the airport capacity, landing direction and/or landing runway.

Effectively, the present invention works to predict the future airport capacity, landing direction and/or landing runway for a set of specified aircraft, during a specified time period, at a specified airport.

Such a system provides a user (i.e., ATC system, airport and/or airline) with the capabilities to continuously predict the future airport capacity, landing direction and/or landing runway for a set of specified aircraft, during a specified time period, at a specified airport so as to more accurately:

a) predict the time each aircraft will reach a specified airport,
b) determine the accuracy of the specified aviation data and the predictions based on that data,
c) compare the predicted unaltered trajectory of the specified assets to the airline's capabilities and business and operational goals,
d) build and analyze alternative scenarios to look for a solution that better meets the business and operational goals of a user airline (i.e., optimize the airline assets to increase profits), airport and ATC system,
e) display the chosen trajectory solution set for each of the airline assets to a system operator who can allow the present invention to automatically or manually accept/modify the proposed solution as required,
f) coordinate the targeted trajectory solution set with other users/aviation authorities and seeks authorization for use of the common assets as required,
g) communicate the assigned trajectories to each of the asset operators for each of the controlled assets,
h) continuously monitor the system to include the specified asset trajectories and other specified data and the airline's business and operational goals so as to identify any changes to the system or an action by one of the assets that prevents achievement of a assigned trajectory set, and i) measure the airline's overall airline condition to determine if an updated solution set would better meet the operator's business and other goals.
j) implement and continuously monitor the updated trajectory solutions set as defined above.

It is therefore an object of the present invention to provide a process, method and system for predicting the future airport capacity, landing direction and/or landing runway for a set of specified aircraft, during a specified time period, at a specified airport to overcome the limitations of the prior art described above.

It is another object of the present invention to present a method and system for the prediction of the future airport capacity, landing direction and/or landing runway for a set of specified aircraft, during a specified time period, at a specified airport, from a system perspective, that takes into consideration a wider array of parameters and factors not heretofore considered.

For example, such parameters and factors of aviation data may include, but is not limited to: weather (winds, temperature, cloud ceiling, precipitation, visibility, etc.), airport design and layout, airport/ramp/taxiway congestion (i.e., number of aircraft at the airport taxing to or waiting for a gate, etc.), available runways, runway length, runway turnoffs, runway condition (dry, wet, icy, snow covered, etc.), available taxiways, taxiway conditions, arrival demand (number of aircraft predicted to land), departure demand (number of aircraft planned to depart the specified airport, etc.), ongoing airport maintenance, etc.

It is a still further object of the present invention to provide a method and system (process or operating model) that analyzes larger amounts of tactical aviation related data/information and other factors simultaneously, identifies system constraints and problems as early as possible, uses said aviation data to predict airport capacity, landing direction and/or landing runway for a set of specified aircraft, during a specified time period, at a specified airport.

It is still a further object of the present invention to continuously measure the accuracy of said airport capacity, landing direction and/or landing runway prediction.

It is an additional object of the present invention to provide a method and system to continuously increase the accuracy of said airport capacity, landing direction and/or landing runway prediction by continuously monitoring the resultant accuracy of previous airport capacity, landing direction and/or landing runway predictions.

Such objects are different from the current art, which subjectively, manually, less accurately and sometimes never predicts the airport capacity, landing direction and/or landing runway.

These and other objects and advantages of the present invention will become readily apparent as the invention is better understood by reference to the accompanying drawings and the detailed description that follows.

SUMMARY OF THE INVENTION

The present invention is generally directed to satisfying the needs set forth above and overcoming the limitations and problems identified with prior methods for managing various airline functions and services.

In a general sense, the embodiment of the present invention is a method for calculating the current and future landing airport capacity, landing direction, landing runway and runways available for a set of specified aircraft, during a specified time period, at a specified airport t.

The method of the present invention involves the continual monitoring of the global, real time forecast and current weather data, current and past landing rates, current and past departure rates, airline schedules, real time demand rates, airport information, etc., to better predict the airport capacity, landing direction, landing runway and runways available for a set of specified aircraft, during a specified time period, at a specified airport.

In accordance with the present invention, a preferred embodiment of this invention takes the form of a computer program product in a computer readable memory for controlling a processor to more accurately predict the airport capacity, landing direction, landing runway and runways available for a specified set of aircraft, during a specified time at a specified airport, based upon specified data comprised of the historical and current weather, airport conditions/configuration, arrival/departure demand, associated system resources, aviation system specified criteria and other specified data, some of which is temporally varying, said method comprising the steps of:

(1) a means of continuously collecting and storing the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions and other specified data during a specified time period, at a specified airport to create a historical database of said data, (2) a means of continuously measuring the actual airport capacity, actual landing direction and actual landing runway for a set of specified aircraft, during a specified time period, at a specified airport to create a historical database of said data, (3) a means for continuously collecting and storing the actual airport capacity, actual departure capacity, actual landing direction and actual landing runway for a set of specified aircraft, during a specified time period, at a specified airport to create a historical database of said data, (4) a means for assigning to each of the plurality of data a figure of merit whose value is a measure of the accuracy of the data, wherein the Figure of Merit (FOM), having a specified value, which, when exceeded, implies that the plurality of data is of sufficient accuracy and reliability so as to warrant its use in the prediction of the airport capacity, landing direction, landing runway and runways available for a set of specified aircraft, during a specified time period, at a specified airport, (5) a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, (6) a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, (7) a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, (8) a means for continuously collecting and updating the databases and other specified data to capture the latest information, such that the databases represent a data set for a time period that represents a current and statistically accurate view of the historical data for a set of specified aircraft, during a specified time period, at a specified airport, (9) a means of communicating the predicted airport capacity, landing direction, landing runway and runways available, once the FOM is above a specified value, to the aviation and other processes, systems and personnel that have use of this information,

(10) a means of continuously monitoring the ongoing temporal changes in the specified data so as to identify temporally updated data applicable for a set of specified aircraft, during a specified time period, at a specified airport,

(11) a means for continuously collecting and storing the specified updated data for a set of specified aircraft, during a specified time period, at a specified airport, (12) a means to determine when the specified data varies beyond a specified amount such that the system provides:

i. a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, ii. a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, iii. a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, iv. a means of communicating the predicted airport capacity, landing direction, landing runway and runways available, once the FOM is above a specified value, to the aviation and other processes, systems and personnel that have use of this information, In another preferred embodiment, the present invention takes the form of a method to allow an airline, aviation authority or other aviation entity to more accurately predict the airport capacity, landing direction, landing runway and runways available for a specified set of aircraft, during a specified time at a specified airport, based upon specified data comprised of the historical and current weather, airport conditions/configuration, arrival/departure demand, associated system resources, aviation system specified criteria and other specified data, some of which is temporally varying, said method comprising the steps of:

(1) continuously collecting and storing the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions and other specified data during a specified time period, at a specified airport to create a historical database of said data, (2) continuously measuring the actual airport capacity, actual landing direction and actual landing runway for a set of specified aircraft, during a specified time period, at a specified airport to create a historical database of said data, (3) continuously collecting and storing the actual airport capacity, actual departure capacity, actual landing direction and actual landing runway for a set of specified aircraft, during a specified time period, at a specified airport to create a historical database of said data, (4) assigning to each of the plurality of data a figure of merit whose value is a measure of the accuracy of the data, wherein the Figure of Merit (FOM), having a specified value, which, when exceeded, implies that the plurality of data is of sufficient accuracy and reliability so as to warrant its use in the prediction of the airport capacity, landing direction, landing runway and runways available for a set of specified aircraft, during a specified time period, at a specified airport, (5) correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, (6) a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, (7) a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, (8) continuously collecting and updating the databases and other specified data to capture the latest information, such that the databases represent a data set for a time period that represents a current and statistically accurate view of the historical data for a set of specified aircraft, during a specified time period, at a specified airport, (9) a means of communicating the predicted airport capacity, landing direction, landing runway and runways available, once the FOM is above a specified value, to the aviation and other processes, systems and personnel that have use of this information,

(10) a means of continuously monitoring the ongoing temporal changes in the specified data so as to identify temporally updated data applicable for a set of specified aircraft, during a specified time period, at a specified airport,

(11) continuously collecting and storing the specified updated data for a set of specified aircraft, during a specified time period, at a specified airport,

(12) determine when the specified data varies beyond a specified amount such that the system provides:

i. correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, ii. a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, iii. a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, iv. a means of communicating the predicted airport capacity, landing direction, landing runway and runways available, once the FOM is above a specified value, to the aviation and other processes, systems and personnel that have use of this information, In accordance with another preferred embodiment of the present invention, a system, including a processor, memory, display and input device, for an aviation system to predict the airport capacity, landing direction, landing runway and runways available during a specified time period at a specified airport, based upon specified data, some of which are temporally varying, is comprised of the means for achieving each of the process steps listed in the above methods.

Thus, there has been summarized above, rather broadly, the present invention in order that the detailed description that follows may be better understood and appreciated. There are, of course, additional features of the invention that will be described herein, and which will form the subject matter of any eventual claims to this invention.

BRIEF DESCRIPTION OF THE DRAWINGS

FIG. 1 illustrates the various processes, steps and tasks necessary in the operation of an airline.

FIG. 2 illustrates many of the elements that must be managed by an airline as they are centered on the movement of aircraft.

FIG. 3A-3B provides a more detailed, tabular description of the customers' needs and wants and the airline tasks/processes required to meet those needs and wants so as to meet the airline's business and operational goals.

FIG. 4A-4E provides a more detailed, tabular description of the decision making process to determine a more optimal gate arrival time for each aircraft, an important use of the present invention.

FIG. 5 illustrates a typical arrival/departure flow from a busy airport.

FIG. 6 presents a depiction of the arrival/departure trombone method of sequencing aircraft.

FIG. 7 illustrates the various types of data and the date flow that is used in one embodiment of the process of the present invention.

FIG. 8 illustrates some of the high level tasks that are currently being managed in the operation of a typical airline.

FIG. 9 illustrates the effects of variance within an aircraft arrival flow to an airport, such that as demand nears capacity, queuing, and therefore delays increase.

FIG. 10 Historical Airport capacity based on Correlation of Weather/Runways Available FIG. 11 illustrates an example of a long trajectory of a single aircraft as used in the prediction process.

DEFINITIONS

AADC—Airport Arrival Demand Chart is provided by the FAA as a way to show current and future arrival demand versus capacity. This can be found on the web at http://www.fly.faa.gov/Products/AADC/aadc.html.

ACARS—ARINC Communications Addressing and Reporting System. This is a discreet data link system between the aircraft and the airline. This provides very basic email capability between the aircraft and a limited set of personnel. Also provides access for the pilot to a limited set of operational data. Functionality from this data link source includes operational data, weather data, pilot to dispatcher communication, pilot to aviation authority communication, airport data, OOOI data, etc.

ASDI—Aircraft Situational Display to Industry is an acronym for a real time data source (approximately 1 to 5 minute updates) provided by the Federal Aviation Administration, comprising aircraft position and intent for the aircraft flying over the United States and beyond.

Aircraft Trajectory—The past, current and future movement or usage of an aircraft defined as a position and time (past, present or future). For example, the trajectory of an aircraft is depicted as a position, time and intent. This trajectory can include in flight positions, as well as taxi positions, and even parking at a specified gate or parking spot.

Airline—a business entity engaged in the transportation of passengers, bags and cargo on an aircraft.

Airline Arrival Bank—A component of an airline's operation where numerous aircraft, owned by a single airline, arrive at a specific airport (hub airport) within in a very short time frame.

Airline Departure Bank—A component of an airline's operation where numerous aircraft, owned by a single airline, depart from a specific airport (hub airport) within a very short time frame.

Airline Gate—An parking area, spot, jetway or other structure where aircraft owners/airlines park their aircraft for the purpose of loading and unloading passengers, cargo, etc.

Air Traffic Control System (ATC)—A system to assure the safe separation of aircraft operated by an aviation regulatory authority. Typically, this is a government-controlled agency, but a recent trend is to privatize this function. In numerous countries, the Civil Aviation Authority (CAA) manages this system. In the United States the federal agency responsible for this task is the Federal Aviation Administration (FAA).

ANSP—Air Navigational Service Provider is an aviation entity that provides aviation services such as Air Traffic Control, navigational aids, etc., such as FAA in the US.

Arrival/Departure Times—Refers to the time an aircraft was, or will be at a certain point along its trajectory. While the arrival/departure time at the gate is commonly the main point of interest for most aviation entities and airline customers, the arrival/departure time referred to herein can refer to the arrival/departure time at or from any point along the aircraft's present or long trajectory.

Arrival/departure fix/Cornerpost—At larger airports, the aviation regulatory authorities have instituted structured arrival/departure points that force all arrival/departure aircraft over geographic points (typically four for arrivals and four for departures, see FIG. 7). These are typically 30 to 50 miles from the arrival/departure airport and are separated by approximately 90 degrees. The purpose of these arrival/departure points or cornerposts is so that the controllers can better sequence the aircraft, while keeping them separate from the other arrival/departure aircraft flows. In the future it may be possible to move these merge points closer to the airport or even the runway end. As described herein, the arrival/departure cornerpost referred to herein will be one of the points where the aircraft merge. Additionally, besides an airport, as referred to herein, an arrival/departure fix/cornerpost can refer to entry/exit points to any system resource, e.g., a runway, an airport gate, a section of airspace, a CAA control sector, a section of the airport ramp, etc. Further, an arrival/departure fix/cornerpost can represent an arbitrary point in space where an aircraft is or will be at some past, present or future time.

Asset—To include assets such as aircraft, airports, runways, and airspace, aircraft jetway, gates, fuel trucks, lavatory trucks, and labor assets necessary to operate any and all of the aviation assets.

Asset Trajectory—The past, current and future movement or usage of any asset (i.e., aircraft, gate, personnel, equipment, etc.) as defined as a position, time (past, present or future). See Aircraft Trajectory.

ATIS—Automatic Terminal Information Service provides current weather, runway and airport information and is a continuous broadcast of digital and recorded audio non-control information in busier terminal (i.e. airport) areas. ATIS broadcasts contain essential information, such as weather information, which runways are active, available approaches, and any other information required by the pilots, such as important NOTAMs. Pilots usually download via ACARS or listen to an available ATIS broadcast before contacting the local control unit, in order to reduce the controllers' workload and relieve frequency congestion. The recording is updated in fixed intervals or when there is a significant change in the information, like a change in the active runway. It is given a letter designation (e.g. bravo), from the ICAO spelling alphabet. The letter progresses down the alphabet with every update and starts at Alpha after a break in service of 12 hours or more. When contacting the local control unit, a pilot will indicate he/she has "information" and the ATIS identification letter to let the controller know that the pilot is up to date with all current information.

ADS—Automatic Dependent Surveillance is a data link surveillance system, to include ADS-B (Automatic Dependent Surveillance-Broadcast) and ADS-C (Automatic Dependent Surveillance-Contract). This system, which is installed on the aircraft, captures the aircraft position from the onboard navigation system and then communicates it to the CAA/FAA, other aircraft, etc.

Aviation Authority—This is the agency responsible for aviation safety. In the US, this agency is the Federal Aviation Administration (FAA). In numerous other countries, it is referred to as the Civil Aviation Authority (CAA). As referred to herein, it can also mean an airport authority. Also see ANSP.

Block Time—The time from aircraft gate departure to aircraft gate arrival. This can be either scheduled block time (schedule departure time to scheduled arrival/departure time as posted in the airline schedule) or actual block time (time from when the aircraft door is closed and the brakes are released at the departure station until the brakes are set and the door is open at the arrival station).

CAA—Civil Aviation Authority is meant to refer to any aviation authority responsible for aviation safety, including the FAA within the US. Also see ANSP.

CDM—Cooperative Decision-Making is a program between FAA and the airlines wherein the airlines provide the FAA a more realistic real time schedule of their aircraft. For example if an airline cancels 20% of its flights into a hub because of bad weather, it would advise the FAA. In turn, the FAA compiles the data and redistributes it to all participating members.

CMFU—EuroControl Central Management Flow Unit.

Common Assets—Assets that must be utilized by the all airspace/airport/runway users and which are usually controlled by the aviation authority (e.g., CAA, FAA, airport). These assets (e.g., runways, ATC system, airspace, etc.) are not typically owned by any one airspace user.

Controlled Asset—An airline asset owned by, and or one that can be controlled by a particular airline. Controlled assets are ones that the airline can exercise a level of control as to its trajectory, movement, usage, and or other operational factors. An example of a controlled asset is an airline's aircraft.

CTAS—Center Tracon Automation System—This is a NASA developed set of tools (TMA, FAST, etc.) that seeks to temporally track and manage the flow of aircraft from approximately 150 miles from the airport to arrival/departure.

FAA—Federal Aviation Administration is the government agency responsible for the safety of the U.S. aviation system, including the safe separation of aircraft while they are in the air or on the ground within the United States.

Four-dimensional Path—The definition of the movement of an object in one or more of four dimensions—x, y, z and time.

Gate—An area where an aircraft parks to unload passengers, bags and cargo. Used herein, it can refer to a parking where a jetway or outside stairs, etc., is used to deplane and board the passengers. Additionally, this could be a parking area where the aircraft is left for an extended period of time, such as overnight.

Goal Function—a method or process of measurement of the degree of attainment for a set of specified goals. As further used herein, a optimization method or process to evaluate the current scenario against a set of specified goals, generate various alternative scenarios, with these alternative scenarios, along with the current scenario then being assessed with the goal attainment assessment process to identify which of these alternative scenarios will yield the highest degree of attainment for a set of specified goals. The purpose of the Goal function is to find a solution that "better" meets the specified goals (as defined by the operator) than the present condition and determine if it is worth (as defined by the operator) changing to the "better" condition/solution. This is always true, whether it is the initial run or one generated by the continuous monitoring system. In the case of the monitoring system (and this could even be set up for the initial condition/solution as well), it is triggered by some defined difference (as defined by the operator) between the how well the present condition meets the specified goals versus some "better" condition/solution found by the present invention. This can be done by assigning a "value" of how well a certain solution set meets the operator's goals. Once the Goal function finds a "better" or higher value condition/solution, that it determines is worth changing to, the present invention translates said "better" condition/solution into some doable task and then communicates this to the interested parties, and then monitors the new current condition to determine if any "better" condition/solution can be found and is worth changing again.

Hub Operation—An airline operating strategy whereby passengers from various cities (spokes) are funneled to an interchange point (hub) and connect with flights to various other cities. This allows the airlines to capture greater amounts of traffic flow to and from cities they serve, and offer smaller communities one-stop access to literally hundreds of nationwide and worldwide destinations.

IFR—Instrument Flight Rules. A set of flight rules wherein the pilot files a flight plan with the aviation authorities responsible for separation safety. Although this set of flight rules is based on instrument flying (e.g., the pilot references the aircraft instruments) when the pilot cannot see at night or in the clouds, the weather and the pilot's ability to see outside the aircraft are not a determining factors in IFR flying. When flying on an IFR flight plan, the aviation authority (e.g., ATC controller) is responsible for the separation of the aircraft.

METAR—Meteorological Terminal Aviation Routine Weather Report or Meteorological Aerodrome Report Service provides current weather information. A typical METAR contains data for the temperature, dew point, wind speed and direction, precipitation, cloud cover and heights, visibility, and barometric pressure. A METAR may also contain information on precipitation amounts, lightning, and other information that would be of interest to pilots or meteorologists such as a pilot report or PIREP and runway visual range (RVR). In addition, a short period forecast called a TREND may be added at the end of the METAR covering likely changes in weather conditions in the two hours following the observation. These are in the same format as a Terminal Aerodrome Forecast (TAF). Typically updated each hour, or if conditions change significantly.

Long Trajectory—The ability to look beyond the current flight segment to build the trajectory of an aircraft for x hours (typically 24) into the future. This forward looking, long trajectory may include numerous flight segments for an aircraft, with the taxi time and the time the aircraft is parked at the gate included in this trajectory. For example, given an aircraft's current position and other factors, it is predicted to land at ORD at 08:45, be at the gate at 08:52, depart the gate at 09:35, takeoff at 09:47 and land at DCA at 11:20 and be at the DCA gate at 11:31. At each point along this long trajectory, numerous factors can influences and change the trajectory. The more accurately the process can predict these factors, the more accurately the prediction of each event along the long trajectory. Further, within the present invention, the long trajectory is used to predict the location of an aircraft at any point x hours into the future.

OOOI—A specific aviation data set (Out, Off, On and In) comprised of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at the hub airport by the hub airline. This proprietary device allows the airline's operational people on the ground to display the airborne aircraft in the vicinity (up to approximately 150 miles) of the airport where it is installed. This system has a local capability to predict landing times based on the current flow of aircraft, thus incorporating a small aspect of the ATC prediction.

Strategic Tracking—The use of long-range information (current time up to "x" hours into the future, where "x" is defined by the operator of the present invention, typically 24 hours) to determine demand and certain choke points in the aviation system along with other pertinent data as this information relates to the trajectory of each aircraft, gate, etc.

System Resource—a resource like an airport, runway, gate, ramp area, or section of airspace, etc., that is used by all assets, (e.g., aircraft). A constrained system resource is one where demand for that resource exceeds capacity. This may be an airport with 70 aircraft that want to land in a single hour, with arrival/departure capacity of 50 aircraft per hour. Or it could be an airport with 2 aircraft wanting to land at the same exact time, with capacity of only 1 arrival/departure at a time. Or it could be a hole in a long line of thunderstorms that many aircraft want to utilize. Additionally, this can represent a group or set of system resources that can be track and predicted simultaneously. For example, an arrival/departure cornerpost, runaway and gate represent a set of system resources that can be track and predictions made as a combined set of resources to better predict the arrival/departure times of aircraft.

TAF—Terminal Aerodrome Forecast is a format for reporting weather forecast information, particularly as it relates to aviation. TAFs apply to a five statute mile radius from the center of the airport runway complex. Generally, TAFs can apply to a 9- or 12-hour forecast; some TAFs cover an 18 or 24 hour period. TAFs for some major airports cover 30 hour periods. The date/time group reflects the new 30 hour period in Coordinated Universal Time (UTC), as always. TAFs complement and use similar encoding to METAR reports. They are produced by a human forecaster based on the ground. For this reason there are fewer TAF locations than there are METARs. TAFs can be more accurate than Numerical Weather Forecasts, since they take into account local, small-scale, geographic effects.

Tactical Tracking—The use of real time information (current time up to "n1" minutes into the future, where "n1" is defined by the operator of the present invention, typically 1 to 5 hours) to predict asset trajectories.

Trajectory—See aircraft trajectory and four-dimensional path above.

VFR—Visual Flight Rules. A set of flight rules wherein the pilot may or may not file a flight plan with the aviation authorities responsible for separation safety. This set of flight rules is based on visual flying (e.g., the pilot references visual cues outside the aircraft) and the pilot must be able to see and cannot fly in the clouds. When flying on a VFR flight plan, the pilot is responsible for the separation of the aircraft when it moves.

Uncontrolled Asset—An asset that is not owned by, and or one that cannot be controlled by a user airline. Uncontrolled assets are ones that the user airline cannot exercise any level of direct control as to movement, usage, and or other operational factors. An example of an uncontrolled asset is an airline's competitor's aircraft.

User Airline—The term user airline and airline be will be used interchangeably to denote an airline utilizing the present invention for enhancing its operational effectiveness and efficiency.

DESCRIPTION OF THE PREFERRED EMBODIMENT

Referring now to the drawings wherein are shown preferred embodiments and wherein like reference numerals designate like elements throughout, there is shown in these figures many of the steps involved in embodiments of a method of the present invention. This method effectively predicts the airport capacity, landing direction, landing runway and runways available, based upon consideration of data regarding the current/future weather, airport conditions, arrival/departure demand, historical data and other specified data.

As discussed above, the overall goal of the present invention is to predict the airport capacity, landing direction, landing runway and runways available. It is important to note that the present invention is in some ways the combination of a group of data collection and computational processes. Within the present invention, these processes work cooperatively together to predict the airport capacity, landing direction, landing runway and runways available. These processes include:

1. A data collection and storage process,
2. A database process,

3. An actual airport capacity, landing direction, landing runway and runways available measurement process,
4. A correlation process,
5. An look ahead and predicative process for the specified assets,
6. An accuracy measurement and calculation process,
7. A communication process, and
8. An ongoing monitoring process, which continually monitors the current state of the system before and after the combination of the above parts of the process have been exercised. This monitoring process measures the current state of the assets against their ability to accurately predict the airport capacity, landing direction, landing runway and runways available. If at such time, any of the real time elements of the specified data fall outside of a specified value, the process automatically starts anew.

As depicted in FIG. 1, an airline's operations may be considered as a stepwise process that starts when the passenger selects a destination and books a flight. A ticket is purchased. The passenger, arriving at the airport, may check bags at the curb or inside; checks in and receives a seat and gate assignment; and then proceeds through security to gate and then check in. During this time cargo arrives at the airport.

Passengers are loaded into airplane after the cleaners complete their tasks and flight attendants arrive. Meanwhile, aircraft servicing is underway. This includes: loading bags, cargo, food, and fuel; arrival of pilots; completion of maintenance activities; servicing lavatories; and completion of other necessary services.

Just before departure, the aircraft's cabin door is secured. Once all other servicing is complete the aircraft is ready to depart. The aircraft departs the gate and taxis to the runway. It then takes off and flies to the destination. Upon landing the aircraft must taxi to the arrival gate. Arriving at the destination gate the passengers depart, bags and cargo are deplaned; and passengers retrieve bags and/or proceed to the curb ready to depart the airport. As can be seen within, the present invention works from a system perspective mesh all of the interdependent processes and assets so as to bring all of the airline's assets to the right place, at the right time to better meet the user airline's operational and other goals.

FIG. 4a-4b provides a tabular description of the task/process matrix required to meet an airline business and operational goals. In FIG. 4a is seen to involve a number of parameters that outline a customer's needs and/or wants. FIG. 4b illustrates the processes necessary to meet the customer's needs/wants/expectations broken down into the sub-processes required.

FIG. 5 provides a more detailed, tabular description of sub-process #3: the movement Aircraft Process, and specifically, the task of determining a more optimum arrival time of each controlled aircraft asset. It describes the order of the decision making process within the implementation of one embodiment of the present invention.

Decision 1—Tactical Intra-Aircraft Decisions (FIG. 5b), involves determining the aircraft's needs and/or wants. Each of the individual aircraft's needs and/or wants must be evaluated and balanced against the individual aircraft's other needs and/or wants.

For example, the need to arrive on time must be balanced against the required gate time to assure all of the gate functions can be accomplished to assure the next on-time departure, while evaluating the need to use minimum fuel to reduce costs. For example, if a flight is delayed at the departure station (for any number of reasons) for five minutes, but also needs to arrive four minutes early to assure the next departure, absence modifications to the aircraft trajectory, the flight will be nine minutes behind its preferred trajectory.

Current business management practices within the airline industry do not provide for this required nine minute correction on a system basis, except for block time increases in the system schedule (a strategic process with a three to six month lead-time) or possible actions by individual pilots. Therefore, this hypothetical flight would arrive five minutes late, and then depart again nine minutes late.

However, as shown in FIG. 5b, Decision 1, the present invention would evaluate that selected flight's ability to speed up based on fuel availability, ride conditions, etc., to determine if aircraft trajectory modifications are possible and desirable.

As can be seen in FIG. 5b, Decision 1, upwards of twenty aircraft parameters must be balanced simultaneously to maximize the efficiency of the aircraft. This is quite different than current business practices with the airline industry which usually focus decision making on a very limited data set, i.e., scheduled on-time arrival, and possibly one other parameter—fuel burn, if any at all. Additionally, the current business practice typically will only look at a local optimization (e.g., fuel usage) without regard to the total system optimization.

This embodiment of the present invention recognizes that the tactical requirements of each of the listed parameters have an effect on the real-time decision of what time the aircraft should arrive at the gate. However, it should be noted that the decision-making process represented in Decision 1 (FIG. 5b) is only evaluating the aircraft arrival time in a perfect world—no weather, no other aircraft interferences, no external constraints to the aircraft trajectory. This unrealistic situation will need to be addressed in the later stages of the decision-making process.

To illustrate how this is accomplished, let's assume that using the FIG. 5b, Decision 1 process, a flight wants to arrive at a gate 25 at 08:10 AM. Once the perfect world, optimal gate arrival time has been determined for each aircraft of an airline, the next step is to evaluate the user airline's ability to meet the needs and/or wants of the individual aircraft. This is done at the step illustrated in FIG. 5c, Decision 2—Tactical Intra-Airline Decisions. Here, this decision making process evaluates the airline's ability to meet the needs of each individual aircraft, while also considering their possible interactions with; and needs/wants of the user airline's other aircraft and those of its competitor's aircraft that are approaching the same particular airport.

It can be noted that this step is made more difficult because of the airlines' desires to run hub operations. Such hub operations typically schedule thirty to sixty of the user airline's aircraft to arrive at a single airport in a very short period of time. The aircraft then exchange passengers are serviced and then take off again. The departing aircraft are also scheduled to take off in a very short period of time. Typical hub operations are one to one and a half hours in duration and are repeated at the hub airport eight to twelve times per day.

Thus, such hub operation put a larger burden on the ground assets of an airline, while almost guaranteeing that individual actions taken by asset managers without regard to system optimization will actually degrade the operational outcome. In other words, although the airline hub process is not designed to fail, the present art of local optimization of the individual components of the random, inter-dependent asset flows assures that the hub process fails all too often. Further, the lack of system optimization of this multi-dimensional, interdependent, hub arrival and departure system almost assures a "Ping-Pong" or ripple effect as is seen in the airline industry today (wherein the terms "Ping-Pong" and "ripple effect" are understood to mean that an action by one unit within an interdependent, multi-dimensional system has an unintentional, and often detrimental, effect on another unit within that same system).

For the hypothetical flight that wants to be at gate 25 at 08:10 AM, let's further assume that at 06:10 AM, it is recognized that the aircraft preceding this fight is late and will not arrive on gate 25 until 07:45 AM, and will be on gate 25 until 08:15 AM. Rather than delay the arrival of our 08:10 flight, a possible better choice would be to direct this flight into another gate, but, in this example, let's further assume that, because of the hub operation, all other gates are scheduled to be used until at least 08:20 AM. Given the airline's inability to meet the 08:10 flight's need for a gate at 08:10 AM, the best available solution may be to slow the flight down to save fuel. Thus, after the airline's ability to meet the aircraft's needs and/or wants is added to the solution, this process recommends that the decision be made to change the flight's gate arrival time from 08:10 AM to 08:15 AM.

However, the decision-making process is not complete, as shown in FIG. 5d, Decision 3, to "Tactical External Airline Decisions." These parameters are typically not under the direct control of the airline. An example of an external constraint is the airport capacity.

Building on the above example, let's further assume that the hub arrival airport can typically land seventy-eight aircraft per hour, but because of low visibility weather conditions, this number has been reduced to sixty-two landings per hour. Because of this external constraint, this embodiment of the present invention decision making process must evaluate changing the trajectories of the controlled arrival aircraft to meet the external constraint of sixty-two landings per hour, while still meeting, as best as possible, the parameters in the FIGS. 5b and 5c, Decision 1 and 2 steps.

Thus, it is probable that this external constraint will result in the decision being made to speed-up some aircraft in order to meet earlier arrival times, while others are slowed down. As a result of this Decision 3 step (FIG. 5d), let's further assume that the trajectory of our hypothetical flight is changed so that the flight is now given a final gate arrival time of 08:26 AM.

A unique aspect of this embodiment of the present invention is that it provides a means to accurately predict the airport capacity, landing direction, landing runway and runways available to more accurately convert this new gate time to a manageable control action that can be carried out by the asset managers (the pilots)—speeding-up or slowing-down, as necessary, to arrive at the new gate time and consequently a new cornerpost arrival time (FIG. 5e).

FIG. 11 illustrates the various types of data (and how that data moves within the present invention) that is used in this decision making process within one embodiment of the present invention. These include: air traffic control objectives, generalized surveillance, aircraft kinematics, communication and messages, airspace structure, airspace and runway availability, labor resources, aircraft characteristics, arrival and departure times, weather, gate availability, maintenance, other assets—i.e. lavatories and galley trucks characteristics, and airline business and operational goals.

FIG. 13 displays the various high-level tasks that are currently being managed, mostly independently, in the operation of a typical airline; these include the tasks associated with on-ground support and the arrival/departure of the airline's aircraft.

A key advantage of the process of the above described embodiment of the present invention is that it takes into consideration a more complete picture of the various factors that can affect the airport capacity, landing direction, landing runway and runways available. Use of the process of the present invention is fundamentally different than the piecewise decision processes that are currently being used in the airline industry, which may often look at only 1 or 2 data points, or generate the airport capacity, landing direction, landing runway and runways available only for a very short period into the future (present up to 15 minutes), which differs from the present invention which more accurately predicts airport capacity, landing direction, landing runway and runways available into the future (i.e., 1 to 8 hours).

Finally, to better illustrate the differences between the present invention and the prior means used for managing an airline, consider the following examples:

EXAMPLE 1

A statistical relevant amount of historical METAR and TAF data is collected and compared to the historical actual airport capacity, historical actual landing direction, historical actual landing runway and historical actual runways available corresponding to that same time period to create a grid. A possible example of this grid is comprised of the weather conditions on the vertical access and the runways available on the horizontal access (see FIG. 16).

Them by correlating the historical actual weather conditions at a specific airport to historical actual airport capacity, historical actual landing direction and historical actual landing runway for those weather conditions, when a certain number of runways are available for departure, the present invention can generate a table of historical actual landing rates for many of the weather and runway conditions for a set of specified aircraft, during a specified time period, at a specified airport..

The present invention can then use the TAF to determine the predicted future weather, other information to predict the runways available and other airport conditions (taxi, etc.) enter the table for that weather, and use the historical actual data to predict the airport capacity into the future (present to 5, or more, hours into the future) for a set of specified aircraft, during a specified time period, at a specified airport.

Using the table in FIG. 16, we can see that if the current weather as reported by the ATIS is a ceiling of 100', the visibility is of a mile and only one runway is available, the predicted airport capacity, based on the historical data set for a set of specified aircraft, during a specified time period, at a specified airport would be 29 landings per hour.

Further, if the TAF predicted that the ceiling would be 3,000', the visibility 10 miles and 2 runways available, the predicted airport capacity, based on the historical data set for a set of specified aircraft, during a specified time period, at a specified airport would be 74 landings per hour.

Further, if an embodiment of the present invention encompassed a more complex table taking into account historical winds, the historical landing runway and other factors for a set of specified aircraft, during a specified time period, at a specified airport, the present invention could also provide a predicted landing direction and landing runway for a set of specified aircraft, during a specified time period, at a specified airport.

The foregoing description of the invention has been presented for purposes of illustration and description and represents a simple example of the present invention. A more accurate version of the present invention might correlate wind direction, wind speed, cloud ceiling height, visibility, arrival/ departure demand and other specified data to further increase the accuracy of the user's ability to predict airport capacity, landing direction, landing runway and runways available into the future (i.e., 1 to 8 hours) for a set of specified aircraft, during a specified time period, at a specified airport.

In another preferred embodiment of the present invention, the historical grid would correlating historical conditions to historical airport capacity, landing direction and landing runway for a set of specified aircraft, during a specified time period, at a specified airport may encompass a 3 dimensional grid and contain many more data points.

Further, the description is not intended to limit the invention to the form disclosed herein. Consequently, variations and modifications commensurate with the above teachings and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

We claim:

1. A computer program product in a computer readable memory for controlling a processor to allow an airline, aviation authority or other entity to more accurately predict the airport capacity, landing direction, landing runway and runways available for a specified set of aircraft, during a specified time at a specified airport, based upon specified data comprised of the historical and current weather, airport conditions/configuration, arrival/departure demand, associated system resources, aviation system specified criteria and other specified data, some of which is temporally varying, said method comprising the steps of:

a means of continuously collecting and storing the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions and other specified data during a specified time period, at a specified airport to create a historical database of said data, a means of continuously measuring the actual airport capacity, actual landing direction and actual landing runway for a set of specified aircraft, during a specified time period, at a specified airport to create a historical database of said data, a means for continuously collecting and storing the actual airport capacity, actual departure capacity, actual landing direction and actual landing runway for a set of specified aircraft, during a specified time period, at a specified airport to create a historical database of said data, a means for assigning to each of the plurality of data a figure of merit whose value is a measure of the accuracy of the data, wherein the Figure of Merit (FOM), having a specified value, which, when exceeded, implies that the plurality of data is of sufficient accuracy and reliability so as to warrant its use in the prediction of the airport capacity, landing direction, landing runway and runways available for a set of specified aircraft, during a specified time period, at a specified airport, a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means for continuously collecting and updating the databases and other specified data to capture the latest information, such that the databases represent a data set for a time period that represents a current and statistically accurate view of the historical data for a set of specified aircraft, during a specified time period, at a specified airport.

2. A computer program product as recited in claim 1, further comprising the steps of:

a means of communicating the predicted airport capacity, landing direction, landing runway and runways available, once the FOM is above a specified value, to the aviation and other processes, systems and personnel that have use of this information.

3. A computer program product as recited in claim 2, further comprising the steps of:

a means of continuously monitoring the ongoing temporal changes in the specified data so as to identify temporally updated data applicable for a set of specified aircraft, during a specified time period, at a specified airport, a means for continuously collecting and storing the specified updated data for a set of specified aircraft, during a specified time period, at a specified airport, a means to determine when the specified data varies beyond a specified amount such that the system provides:

a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means of communicating the predicted airport capacity, landing direction, landing runway and runways available, once the FOM is above a specified value, to the aviation and other processes, systems and personnel that have use of this information.

4. A computer program product as recited in claim 3, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

5. A computer program product as recited in claim 1, further comprising the steps of:

a means of continuously monitoring the ongoing temporal changes in the specified data so as to identify temporally updated data applicable for a set of specified aircraft, during a specified time period, at a specified airport, a means for continuously collecting and storing the specified updated data for a set of specified aircraft, during a specified time period, at a specified airport, a means to determine when the specified data varies beyond a specified amount such that the system provides:

a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means of communicating the predicted airport capacity, landing direction, landing runway and runways available, once the FOM is above a specified value, to the aviation and other processes, systems and personnel that have use of this information.

6. A computer program product as recited in claim 5, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

7. A computer program product as recited in claim 2, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

8. A computer program product as recited in claim 1, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

9. A method to allow an airline, aviation authority or other aviation entity to more accurately predict the airport capacity, landing direction, landing runway and runways available for a specified set of aircraft, during a specified time at a specified airport, based upon specified data comprised of the historical and current weather, airport conditions/configuration, arrival/departure demand, associated system resources, aviation system specified criteria and other specified data, some of which is temporally varying, said method comprising the steps of:

continuously collecting and storing the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions and other specified data during a specified time period, at a specified airport to create a historical database of said data, continuously measuring the actual airport capacity, actual landing direction and actual landing runway for a set of specified aircraft, during a specified time period, at a specified airport to create a historical database of said data, continuously collecting and storing the actual airport capacity, actual departure capacity, actual landing direction and actual landing runway for a set of specified aircraft, during a specified time period, at a specified airport to create a historical database of said data, a means for assigning to each of the plurality of data a figure of merit whose value is a measure of the accuracy of the data, wherein the Figure of Merit (FOM), having a specified value, which, when exceeded, implies that the plurality of data is of sufficient accuracy and reliability so as to warrant its use in the prediction of the airport capacity, landing direction, landing runway and runways available for a set of specified aircraft, during a specified time period, at a specified airport, a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means for continuously collecting and updating the databases and other specified data to capture the latest information, such that the databases represent a data set for a time period that represents a current and statistically accurate view of the historical data for a set of specified aircraft, during a specified time period, at a specified airport.

10. A computer program product as recited in claim 9, further comprising the steps of:

communicating the predicted airport capacity, landing direction, landing runway and runways available, once the FOM is above a specified value, to the aviation and other processes, systems and personnel that have use of this information.

11. A computer program product as recited in claim 10, further comprising the steps of:

continuously monitoring the ongoing temporal changes in the specified data so as to identify temporally updated data applicable for a set of specified aircraft, during a specified time period, at a specified airport, a means for continuously collecting and storing the specified updated data for a set of specified aircraft, during a specified time period, at a specified airport, a means to determine when the specified data varies beyond a specified amount such that the system provides:

a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, communicating the predicted airport capacity, landing direction, landing runway and runways available, once the FOM is above a specified value, to the aviation and other processes, systems and personnel that have use of this information.

12. A computer program product as recited in claim 11, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

13. A computer program product as recited in claim 9, further comprising the steps of:
   continuously monitoring the ongoing temporal changes in the specified data so as to identify temporally updated data applicable for a set of specified aircraft, during a specified time period, at a specified airport,
   a means for continuously collecting and storing the specified updated data for a set of specified aircraft, during a specified time period, at a specified airport,
   a means to determine when the specified data varies beyond a specified amount such that the system provides:
   a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway,
   a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport,
   a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport,
   a means of communicating the predicted airport capacity, landing direction, landing runway and runways available, once the FOM is above a specified value, to the aviation and other processes, systems and personnel that have use of this information.

14. A computer program product as recited in claim 13, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

15. A computer program product as recited in claim 10, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

16. A computer program product as recited in claim 9, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

17. A system, including a processor, memory, display and input device to allow an airline, aviation authority or other entity to more accurately predict the airport capacity, landing direction, landing runway and runways available for a specified set of aircraft, during a specified time at a specified airport, based upon specified data comprised of the historical and current weather, airport conditions/configuration, arrival/departure demand, associated system resources, aviation system specified criteria and other specified data, some of which is temporally varying, said method comprising the steps of:
   a means of continuously collecting and storing the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions and other specified data during a specified time period, at a specified airport to create a historical database of said data,
   a means of continuously measuring the actual airport capacity, actual landing direction and actual landing runway for a set of specified aircraft, during a specified time period, at a specified airport to create a historical database of said data,
   a means for continuously collecting and storing the actual airport capacity, actual departure capacity, actual landing direction and actual landing runway for a set of specified aircraft, during a specified time period, at a specified airport to create a historical database of said data,
   a means for assigning to each of the plurality of data a figure of merit whose value is a measure of the accuracy of the data, wherein the Figure of Merit (FOM), having a specified value, which, when exceeded, implies that the plurality of data is of sufficient accuracy and reliability so as to warrant its use in the prediction of the airport capacity, landing direction, landing runway and runways available for a set of specified aircraft, during a specified time period, at a specified airport, a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means for continuously collecting and updating the databases and other specified data to capture the latest information, such that the databases represent a data set for a time period that represents a current and statistically accurate view of the historical data for a set of specified aircraft, during a specified time period, at a specified airport.

18. A computer program product as recited in claim 17, further comprising the steps of:

a means of communicating the predicted airport capacity, landing direction, landing runway and runways available, once the FOM is above a specified value, to the aviation and other processes, systems and personnel that have use of this information.

19. A computer program product as recited in claim 18, further comprising the steps of:

a means of continuously monitoring the ongoing temporal changes in the specified data so as to identify temporally updated data applicable for a set of specified aircraft, during a specified time period, at a specified airport, a means for continuously collecting and storing the specified updated data for a set of specified aircraft, during a specified time period, at a specified airport, a means to determine when the specified data varies beyond a specified amount such that the system provides:

a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means of communicating the predicted airport capacity, landing direction, landing runway and runways available, once the FOM is above a specified value, to the aviation and other processes, systems and personnel that have use of this information.

20. A computer program product as recited in claim 19, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

21. A computer program product as recited in claim 17, further comprising the steps of:

a means of continuously monitoring the ongoing temporal changes in the specified data so as to identify temporally updated data applicable for a set of specified aircraft, during a specified time period, at a specified airport, a means for continuously collecting and storing the specified updated data for a set of specified aircraft, during a specified time period, at a specified airport, a means to determine when the specified data varies beyond a specified amount such that the system provides:

a means for correlating the data in the historical database of the historical actual weather (wind speed/direction, ceiling, visibility, etc.), historical actual runways available, historical actual airport configuration and other specified data during a specified time period, at a specified airport with the historical database of the historical actual airport capacity, historical actual landing direction and historical actual landing runway for the same set of specified aircraft, during the same specified time period, at the same specified airport to determine what historical weather conditions (wind speed/direction, ceiling, visibility, etc.), runways available, airport configuration, arrival/departure demand and other specified data yielded what actual airport capacity, actual landing direction and actual landing runway, a means of using airline schedules, current aircraft position (ASDI, ADS-B, ADS-C, etc.), aircraft flight plans, future aircraft trajectories and other specified data to predict the arrival/departure demand for a set of specified aircraft, during a specified time period, at a specified airport, a means of using the correlation of the data in the historical database for the historical actual weather (wind speed/direction, ceiling, visibility, etc.), historical actual runways available, historical actual airport configuration and other specified data to the historical database of the historical actual airport capacity, historical actual landing direction and historical actual landing runway for the same set of specified aircraft, during the same specified time period, at the same specified airport in conjunction with the current airport weather (i.e., METAR), predicted airport weather (i.e., TAF), current runways available (i.e., ATIS), predicted arrival/departure demand and other specified data to predict the future airport capacity, landing direction, landing runway and runways available for a set of specified aircraft, during a specified time period, at a specified airport, a means of communicating the predicted airport capacity, landing direction, landing runway and runways available, once the FOM is above a specified value, to the aviation and other processes, systems and personnel that have use of this information.

22. A computer program product as recited in claim 21, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

23. A computer program product as recited in claim 18, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

24. A computer program product as recited in claim 17, wherein said specified data is chosen from the group comprised of the forecast weather (i.e., Terminal Area Forecast—TAF), actual weather (i.e., METAR Weather Report, wind speed/direction, ceiling, visibility, etc.), runways available (i.e., Automatic Terminal Information Service—ATIS), airport/runway conditions, the actual airport capacity, actual landing direction, actual landing runway and other specified data for a set of specified aircraft, during a specified time period, at a specified airport.

* * * * *